US012564911B2

(12) United States Patent
Inagaki et al.

(10) Patent No.: US 12,564,911 B2
(45) Date of Patent: Mar. 3, 2026

(54) TOOL STATE LEARNING DEVICE, TOOL STATE ESTIMATION DEVICE, CONTROL DEVICE, TOOL STATE LEARNING METHOD, AND TOOL STATE ESTIMATION METHOD

(71) Applicant: FANUC CORPORATION, Minamitsuru-gun (JP)

(72) Inventors: Shougo Inagaki, Yamanashi (JP); Yasushi Okajima, Yamanashi (JP); Takeshi Saitoh, Tokyo (JP); Tsutomu Uchida, Tokyo (JP)

(73) Assignee: FANUC CORPORATION, Yamanashi (JP)

( * ) Notice: Subject to any disclaimer, the term of this patent is extended or adjusted under 35 U.S.C. 154(b) by 584 days.

(21) Appl. No.: 17/910,638

(22) PCT Filed: Mar. 26, 2021

(86) PCT No.: PCT/JP2021/012861
§ 371 (c)(1),
(2) Date: Sep. 9, 2022

(87) PCT Pub. No.: WO2021/200654
PCT Pub. Date: Oct. 7, 2021

(65) Prior Publication Data
US 2023/0129992 A1     Apr. 27, 2023

(30) Foreign Application Priority Data
Apr. 2, 2020     (JP) ................................. 2020-066518

(51) Int. Cl.
B23Q 17/09     (2006.01)
B23Q 17/24     (2006.01)
G06T 7/00     (2017.01)

(52) U.S. Cl.
CPC ..... *B23Q 17/0995* (2013.01); *B23Q 17/0904* (2013.01); *B23Q 17/2409* (2013.01);
(Continued)

(58) Field of Classification Search
CPC ............ B23Q 17/0995; B23Q 17/0904; B23Q 17/2409; B23Q 17/2452; G06T 7/0004;
(Continued)

(56) References Cited

U.S. PATENT DOCUMENTS

2006/0110024 A1*    5/2006   Wakabayashi ........ G06T 7/0006
                                                              382/141
2018/0246494 A1*    8/2018   Nakahama ......... B23Q 17/0995
2019/0070682 A1     3/2019   Schwarzmann

FOREIGN PATENT DOCUMENTS

CA            3037201 A1 *   3/2018   ........... G06F 16/783
CN            106560751         4/2017
(Continued)

OTHER PUBLICATIONS

M. Ma, C. Sun, X. Chen, X. Zhang and R. Yan, "A Deep Coupled Network for Health State Assessment of Cutting Tools Based on Fusion of Multisensory Signals", IEEE Transactions on Industrial Informatics, vol. 15, No. 12, pp. 6415-6424 (Year: 2019).*
(Continued)

*Primary Examiner* — Shefali D Goradia
(74) *Attorney, Agent, or Firm* — Wenderoth, Lind & Ponack, L.L.P.

(57) ABSTRACT
A tool state learning device has a storage unit for storing an arbitrary image captured by an imaging device imaging a machined surface of an arbitrary workpiece cut using an arbitrary tool, and a teacher data acquisition unit for acquiring, as input data, an arbitrary image stored in the storage unit, and acquiring, as a label, the state of the tool annotated according to prescribed levels indicating the degree of wear
(Continued)

of the tool on the basis of the arbitrary image. The tool state learning device also has a tool state learning unit for using the acquired label and input data to perform supervised learning, and generating a learned model in which a machined surface image of the machined surface of a workpiece imaged by the imaging device is inputted and the state of the tool that cut the machined surface of the workpiece is outputted.

10 Claims, 7 Drawing Sheets

(52) U.S. Cl.
CPC ........ *B23Q 17/2452* (2013.01); *G06T 7/0004* (2013.01); *G06T 2207/20081* (2013.01); *G06T 2207/30164* (2013.01)

(58) Field of Classification Search
CPC . G06T 2207/20081; G06T 2207/30164; G06T 7/0002; G06T 2207/20084; G06T 2207/30136; G06N 3/0464; G06N 3/09
See application file for complete search history.

(56) References Cited

FOREIGN PATENT DOCUMENTS

| | | |
|---|---|---|
| CN | 107544432 | 1/2018 |
| CN | 108227625 | 6/2018 |
| CN | 108500736 | 9/2018 |
| CN | 108627386 | 10/2018 |
| CN | 108733027 | 11/2018 |
| CN | 109465503 | 3/2019 |
| CN | 109562500 | 4/2019 |
| CN | 109571141 | 4/2019 |
| CN | 109581962 | 4/2019 |
| CN | 109976258 | 7/2019 |
| DE | 102019122771 A1 | 3/2020 |
| JP | 4-75854 | 3/1992 |
| JP | 11-267949 | 10/1999 |
| JP | 2018-1288 | 1/2018 |
| JP | 2018-138327 | 9/2018 |
| JP | 2018-181126 | 11/2018 |
| JP | 2019-67137 | 4/2019 |
| JP | 2020-19087 | 2/2020 |

OTHER PUBLICATIONS

Y. D. Chethan, H. V. Ravindra, N. Prashanth, Y. T. Krishne Gowda and T. Gowda, "Machine vision for correlating Tool status and machined Surface in Turning Nickel-base super alloy", International Conference on Emerging Research in Electronics, pp. 48-53 (Year: 2015).*
International Search Report dated May 25, 2021 in corresponding International Application No. PCT/JP2021/012861.

* cited by examiner

FIG. 5

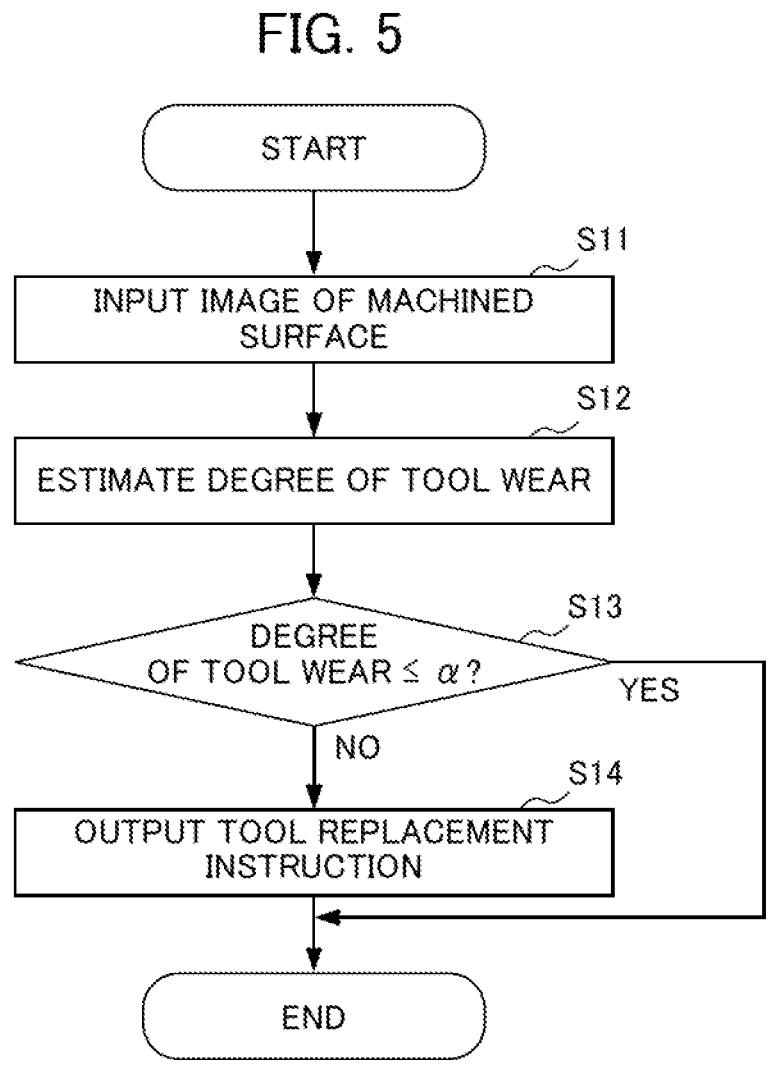

START

INPUT IMAGE OF MACHINED SURFACE — S11

ESTIMATE DEGREE OF TOOL WEAR — S12

DEGREE OF TOOL WEAR $\leq \alpha$ ? — S13

YES

NO

OUTPUT TOOL REPLACEMENT INSTRUCTION — S14

END

FIG. 7

TOOL STATE LEARNING DEVICE, TOOL STATE ESTIMATION DEVICE, CONTROL DEVICE, TOOL STATE LEARNING METHOD, AND TOOL STATE ESTIMATION METHOD

TECHNICAL FIELD

The present invention relates to a tool state learning device, a tool state estimation device, a control device, a tool state learning method, and a tool state estimation method.

BACKGROUND ART

A cutting edge of a tool that is used in a cutting process wears out as the tool is used. Accuracy of cutting is affected by wear of the cutting edge of the tool. For this reason, in general, a useful life time unique to each type of tool is set in advance, and a tool is replaced with a new tool based on the total machining time and the useful life time.

In this respect, there is a known technique for determining a remaining life of a tool. According to the known technique, images of machined surfaces of a plurality of workpieces subjected to cutting are captured, and the remaining life of the tool is determined based on a comparison between a preset threshold value and contrast in the captured images of the machined surfaces, which indicates the quality of the results of the cutting. See, for example, Patent Document 1.

Patent Document 1: Japanese Unexamined Patent Application, Publication No. 2018-1288

DISCLOSURE OF THE INVENTION

Problems to be Solved by the Invention

In the case where numerical data such as the contrast is used as a reference, it is generally difficult to determine a threshold value corresponding to a time for tool replacement because the numerical data may vary depending on workpieces and imaging conditions.

Under the circumstances described above, it is desired to make it easy to estimate a tool state from an image of a machined surface.

Means for Solving the Problems (1) One aspect of the present disclosure is directed to a tool state learning device including: a storage unit configured to store an arbitrary image of a machined surface of an arbitrary workpiece captured by an imaging device, the machined surface having been cut with an arbitrary tool; a teacher data acquisition unit configured to acquire, as input data, the arbitrary image stored in the storage unit and acquires, as a label, a state of the tool, the state being annotated in accordance with predetermined grades each indicating a degree of tool wear based on the arbitrary image; and a tool state learning unit configured to perform supervised learning using the input data and the label that have been acquired by the teacher data acquisition unit, and generates a trained model configured to input a machined surface image of a machined surface of a workpiece captured by the imaging device, and to output a state of a tool with which the machined surface of the workpiece has been cut.

(2) One aspect of the present disclosure is directed to a tool state estimation device including: a trained model generated by the tool state learning device according to (1), the trained model being configured to input a machined surface image of a machined surface of a workpiece captured by an imaging device and to output a state of a tool with which the machined surface of the workpiece has been cut; an input unit configured to input a machined surface image of a machined surface captured by the imaging device; and a tool state estimation unit configured to input the machined surface image inputted by the input unit to the trained model and thereby estimate a state of a tool with which the machined surface shown in the image has been cut.

(3) One aspect of the present disclosure is directed to a control device including the tool state estimation device according to (2).

(4) One aspect of the present disclosure is directed to a tool state learning method including: a teacher data acquisition step including acquiring, as input data, an arbitrary image of a machined surface of an arbitrary workpiece captured by an imaging device, the machined surface having been cut with an arbitrary tool, and acquiring, as a label, a state of the tool, the state being annotated in accordance with predetermined grades each indicating a degree of tool wear based on the arbitrary image; and a tool state learning step including performing supervised learning using the input data and the label that have been acquired, and generating a trained model configured to input a machined surface image of a machined surface of a workpiece captured by the imaging device, and to output a state of a tool with which the machined surface of the workpiece has been cut.

(5) One aspect of the present disclosure is directed to a tool state estimation method including: an input step including inputting an input of a machined surface image of a machined surface captured by an imaging device; and an estimation step including inputting the machined surface image that has been inputted in the input step to a trained model generated by the tool state learning device according to (1), the trained model being configured to input a machined surface image of a machined surface of a workpiece captured by the imaging device and to output a state of a tool with which the machined surface of the workpiece has been cut, and estimating a state of the tool with which the machined surface shown in the machine surface image has been cut.

Effects of the Invention

Each aspect of the present disclosure makes it easy to estimate a state of a tool from an image of a machined surface.

BRIEF DESCRIPTION OF THE DRAWINGS

FIG. 5 is a flowchart illustrating an estimation process performed by a tool state estimation device in an operation phase;

FIG. 7 is a diagram illustrating an example of a configuration of a tool state estimation system.

PREFERRED MODE FOR CARRYING OUT THE INVENTION

One embodiment of the present disclosure will be described with reference to the drawings.

EMBODIMENT

Figure 1:
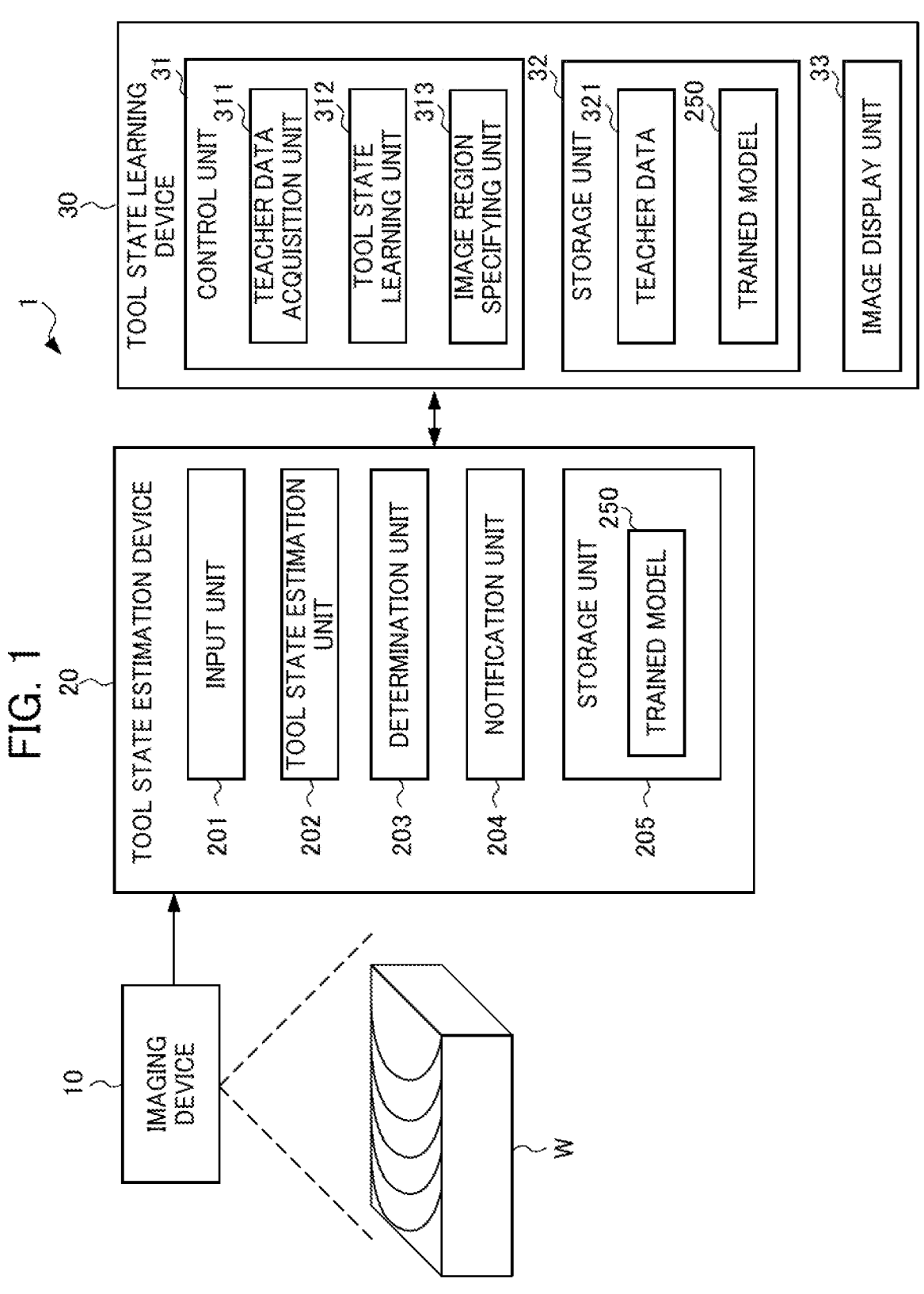
FIG. 1 is a functional block diagram illustrating an example of a functional configuration of a tool state estimation system according to an embodiment.

FIG. 1 is a functional block diagram illustrating an example of a functional configuration of a tool state estimation system according to the embodiment. As illustrated in FIG. 1, the tool state estimation system 1 includes an imaging device 10, a tool state estimation device 20, and a tool state learning device 30.

The imaging device 10, the tool state estimation device 20, and the tool state learning device 30 may be directly connected to one another via a connection interface (not shown). Alternatively, the imaging device 10, the tool state estimation device 20, and the tool state learning device 30 may be connected to one another via a network (not shown), such as a local area network (LAN) or the Internet. In this case, the imaging device 10, the tool state estimation device 20, and the tool state learning device 30 are provided with a communication unit (not shown) for communicating with one another through such a connection. As will be described later, the tool state estimation device 20 may include the tool state learning device 30.

The imaging device 10 includes a digital camera or the like, is disposed at, for example, a machine tool (not shown), and captures an image of a machined surface of a workpiece W cut by the machine tool (not shown). The imaging device 10 outputs the captured image of the machined surface of the workpiece W to the tool state estimation device 20 to be described later, based on a control instruction from a control device (not shown) that controls cutting by the machine tool (not shown).

In an operation phase, the tool state estimation device 20 acquires a captured image of a machined surface of a workpieces W from the imaging device 10. The tool state estimation device 20 then inputs the acquired image of the machined surface of the workpiece W to a trained model provided from the tool state learning device 30 to be described later. Thus, the tool state estimation device 20 can estimate, for example, a degree of wear of the cutting edge of the tool (hereinafter, also referred to as "degree of tool wear") as a state of the tool with which the machined surface of the workpiece W has been cut.

In a learning phase, the tool state estimation device 20 may output an image of a machined surface of a workpieces W acquired from the imaging device 10 to the tool state learning device 30.

The tool state estimation device 20 may be included in a control device (not shown), as will be described later.

Prior to a description of the tool state estimation device 20, the "degree of tool wear" and machine learning for generating the trained model will be described.

<Degree of Tool Wear>

As mentioned above, the "degree of tool wear" indicates a degree of wear of a cutting edge of a tool for use in a cutting process.

Figure 2:
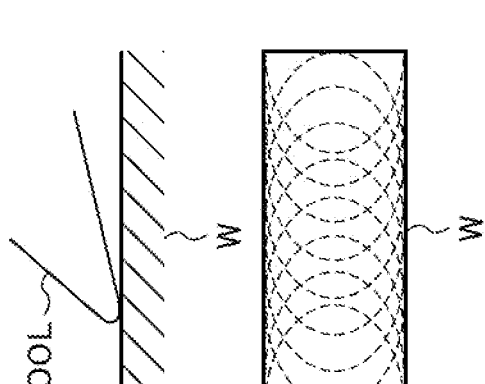
FIG. 2 is a diagram illustrating an example of a relationship between wear of a cutting edge of a tool and a machined surface of a workpiece.
Figure 2:
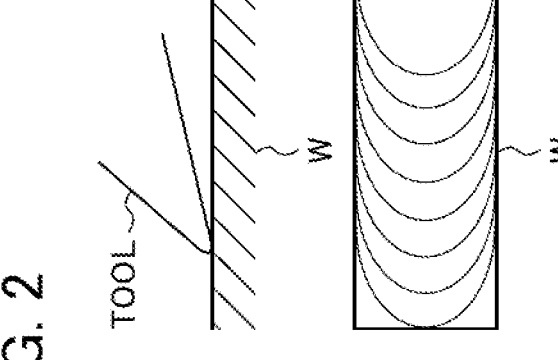
Figure 2:
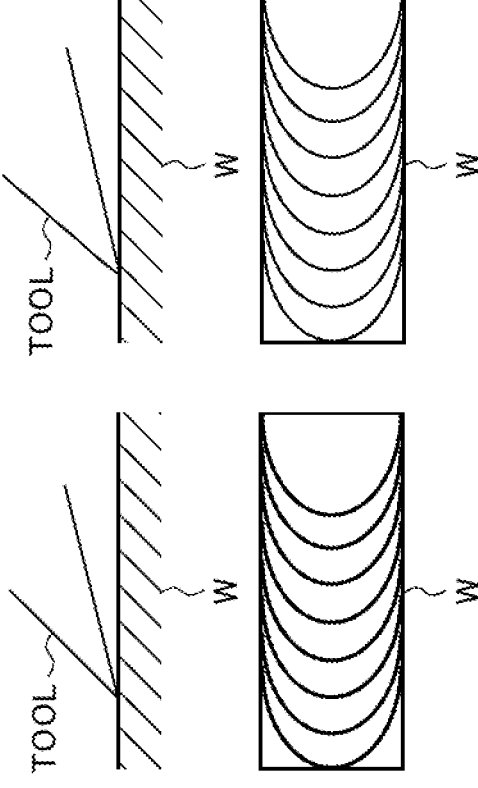

FIG. 2 is a diagram illustrating an example of a relationship between wear of a cutting edge of a tool and a machined surface of a workpiece W. FIG. 2 illustrates, for example, a case of face milling. As shown in FIG. 2, as the number of times of cutting (i.e., the tool usage accumulation time) increases from the left to the right, the cutting edge of the tool wears out, and the cutting traces on the machined surface of the workpiece W gradually change. For example, in the case where the workpiece W is made of aluminum, as the cutting edge of the tool wears out, the machined surface of the workpiece W becomes glossy. For example, in the case where the workpiece W is a casting, as the cutting edge of the tool wears out, the machined surface of the workpiece W becomes dim.

For example, as illustrated in the leftmost portion of FIG. 2, the cutting edge of a new tool is free from wear and has the highest sharpness, and it has a "degree of tool wear" of "0%". Since the cutting edge wears out as the tool is used as illustrated in FIG. 2, the "degree of tool wear" has a value ranging from "0%" to "100%".

Note that the "degree of tool wear" is expressed here as a percentage value ranging from "0%" to "100%", but may be, for example, a value ranging from "0" to "1".

As will be described later, an annotation of a "degree of tool wear" is determined by an operator based on an image captured by the imaging device 10 and showing a machined surface of an arbitrary workpiece.

In the present embodiment, the tool state estimation device 20 is configured to estimate a "degree of tool wear" as a state of a tool that has been used in a cutting process, but this is a non-limiting example. For example, the tool state estimation device 20 may estimate a state of a tool that has been used in a cutting process, in the form of one of two or more grades such as "normal" and "abnormal". In this case, "normal" indicates, for example, a tool state in which cutting can be performed with appropriate machining accuracy, as in the case of two tools illustrated in the left half of FIG. 2. The "abnormal" indicates, for example, a tool state in which the tool is on the verge of the time for replacement, as in the case of two tools illustrated in the right half of FIG. 2.

<Tool State Learning Device 30>

For example, the tool state learning device 30 previously acquires, as input data, an image captured by the imaging device 10 and showing a machined surface of an arbitrary workpiece cut with an arbitrary tool.

Further, based on the image acquired as the input data, the tool state learning device 30 acquires, as a label (correct answer), data indicating a state of the tool with which the machined surface shown in the image has been cut, the state being determined from the machined surface of the workpiece.

The tool state learning device 30 performs supervised learning based on training data including the acquired input data and the label paired with each other, and thereby constructs a trained model to be described later.

In this way, the tool state learning device 30 can provide the constructed trained model to the tool state estimation device 20.

The tool state learning device 30 will be specifically described below.

As illustrated in FIG. 1, the tool state learning device 30 includes a control unit 31, a storage unit 32, and an image display unit 33. The control unit 31 includes a teacher data acquisition unit 311, a tool state learning unit 312, and an image region specifying unit 313.

The image display unit 33 includes a liquid crystal display or the like, and displays an image captured by the imaging device 10, in response to a control instruction from the control unit 31 to be described later.

<Storage Unit 32>

The storage unit 32 includes a random access memory (RAM), a hard disk drive (HDD), etc. The storage unit 32 stores teacher data 321 and the trained model 250.

The teacher data 321 stores an image of a machined surface of an arbitrary workpiece cut with an arbitrary tool. This image is acquired from the imaging device 10 by way of the teacher data acquisition unit 311, which will be described later, via a communication unit (not shown).

The teacher data 321 stores, as a label, data indicating a state ("normal" or "abnormal") of the tool with which the machined surface of the workpiece shown in the stored image has been cut. The state is determined from the machined surface of the workpiece shown in the stored image.

The trained model 250 is constructed by the tool state learning unit 312 to be described later.

<Control Unit 31>

The control unit 31 has a configuration known to those skilled in the art, and includes a central processing unit (CPU), a read only memory (ROM), a RAM, a complementary metal-oxide-semiconductor (CMOS) memory, and the like. These components are communicatively connected to one another via a bus.

The CPU is a processor that controls the overall tool state learning device 30. The CPU reads, via the bus, a system program and application programs stored in the ROM, and controls the overall tool state learning device 30 in accordance with the system program and the application programs. Thus, as illustrated in FIG. 1, the control unit 31 is configured to perform the functions as the teacher data acquisition unit 311, the tool state learning unit 312, and the image region specifying unit 313. The RAM stores various data, such as temporary calculation data and display data. The CMOS memory is backed up by a battery (not shown), and is configured as a non-volatile memory that maintains a storage state even when the tool state learning device 30 is turned off.

In the learning phase, the teacher data acquisition unit 311 acquires, as input data, an image captured by the imaging device 10 and showing a machined surface of an arbitrary workpiece cut with an arbitrary tool, via a communication unit (not shown).

The teacher data acquisition unit 311 displays the acquired image on the image display unit 33, for example. The operator annotates a tool state, i.e., a "degree of tool wear" according to cutting traces, a degree of glossiness, or a degree of dimness of the machined surface shown in the displayed image. The teacher data acquisition unit 311 acquires, as a label, the "degree of tool wear" annotated by the operator via an input device (not shown) such as a keyboard or a touch panel included in the tool state learning device 30.

The teacher data acquisition unit 311 stores the acquired image as the input data and the label of the degree of tool wear as teacher data in the teacher data 321 of the storage unit 32.

The tool state learning unit 312 acquires, as training data, the input data and the label paired with each other, from the teacher data 321 of the storage unit 32. The tool state learning unit 312 performs supervised learning using the acquired training data to construct the trained model 250 that inputs the image captured by the imaging device 10 and outputs a state of the tool with which the machined surface shown in the image has been cut, i.e., a "degree of tool wear".

In the present embodiment, the tool state learning unit 312 may perform machine learning according to a neural network including, for example, a multilayer neural network. For example, a convolutional neural network (CNN) may be applied.

The tool state learning unit 312 provides the constructed trained model 250 to the tool state estimation device 20.

It is desirable to prepare a large number of items of the training data for the supervised learning. For example, the training data may be acquired from imaging devices 10 that are actually in operation at various locations in a site such as a factory of a customer.

When new training data is acquired after the construction of the trained model 250, the tool state learning unit 312 may update the constructed trained model 250 by performing further supervised learning on the constructed trained model 250.

In this way, the training data can be automatically acquired from the ordinary imaging operation of the imaging device 10, whereby the accuracy of estimation of the tool state can be increased daily.

The supervised learning described above may be performed by way of online learning, batch learning, or mini-batch learning.

Online learning is a learning method according to which supervised learning is performed immediately every time an image of a machined surface of a newly cut workpiece W is captured by the imaging device 10 and training data is generated. Batch learning is a learning method according to which supervised learning is performed based on training data including a set of a predetermined number of images of machined surfaces of newly cut workpieces W captured by the imaging device 10. Mini-batch learning is a kind of learning method between the online learning and the batch learning, according to which supervised learning is performed every time training data is accumulated to reach a certain quantity.

The tool state learning unit 312 may construct a trained model 250 that inputs an image of a machined surface captured by the imaging device 10 and tool information regarding the tool with which the machined surface has been cut, and that outputs a state of the tool. In this case, to construct the trained model 250, the tool state learning unit 312 uses, for example, training data including input data paired with a label of a degree of tool wear annotated by the operator, the input data containing an image of a machined surface of an arbitrary workpiece cut with an arbitrary tool and tool information regarding the tool with which the machined surface has been cut, namely, at least one of a material of the tool (e.g., carbon tool steel, ceramic, etc.), a shape of the tool (e.g., cutting tool, face milling tool, etc.), a tool diameter, a tool length, a pre-machining state of the tool, or the like.

In this case, a tool management table (not shown) for managing all tools attachable to a machine tool (not shown) may be stored in a storage unit such as a HDD included in the machine tool or a control device (not shown). Based on a tool number or the like set in a machining program, the tool state learning device 30 may acquire tool information including at least one of a material of the tool, a shape of the tool, a tool diameter, a tool length, a pre-machining state of the tool, or the like from the tool management table (not shown) via the machine tool (not shown) or the control device (not shown).

Alternatively, the tool state learning unit 312 may construct a trained model 250 that inputs an image of a machined surface captured by the imaging device 10, tool information regarding the tool with which the machined surface has been cut, and workpiece information, and that outputs a state of the tool. In this case, to construct the trained model 250, the tool state learning unit 312 uses, for example, training data including input data paired with a label of a degree of tool wear annotated by the operator, the input data containing an image of a machined surface of an arbitrary workpiece cut with an arbitrary tool; tool information regarding the tool with which the machined surface has been cut; and workpiece information regarding the material and the like of the workpiece W as a machining target.

In this way, the estimation accuracy of the trained model 250 can be improved.

The tool state learning unit 312 may construct the trained models 250 on a tool-to-tool basis.

When the tool state learning unit 312 is to perform the supervised training using training data including an image, the image region specifying unit 313 masks, in the image, a region other than a region corresponding to the machined surface of the workpiece W, in order to eliminate effects of the latter region other than the region corresponding to the machined surface.

Figure 3:
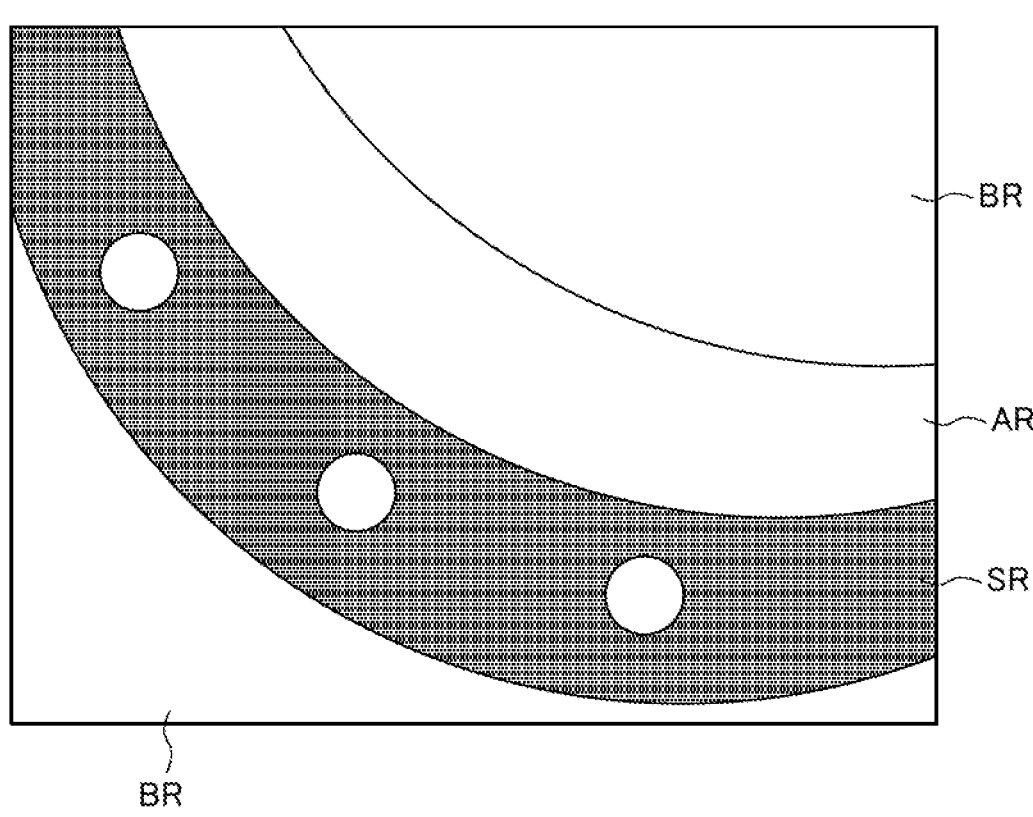
FIG. 3 is a diagram illustrating an example of an image of a machined surface.

FIG. 3 is a diagram illustrating an example of an image of a machined surface. As illustrated in FIG. 3, the image of the machined surface includes an image region SR corresponding to an area of the machined surface and marked with shading, an image region BR corresponding to a background such as a table on which the workpiece W is disposed, and an image region AR corresponding to another area of the machined surface, which has been machined using a tool different from the tool used to machine the area corresponding to the image region SR. In the image captured by the imaging device 10, depending on light impinging onto the machined surface of the workpiece w, the position and shape of the machined surface corresponding to the image region SR may appear unclear due to the effects of, for example, reflection from the image region AR corresponding to the machined surface except for the image region SR and reflection from the image region BR corresponding to the background.

To address the foregoing case, the image region specifying unit 313 performs matching processing by using CAD data acquired from, for example, a CAD/CAM device (not shown) and an image included in the training data, and thereby specifies the image region SR of the machined surface. The image region specifying unit 313 may mask the image region AR corresponding to the machined surface except for the specified image region SR and the image region BR corresponding to the background, and output the image having the masked regions to the tool state learning unit 312.

Thus, the tool state learning device 30 can improve the estimation accuracy of the trained model 250 to be constructed, by performing supervised learning using the image in which the image regions AR and BR are masked but the image region SR of the machined surface is not masked.

For example, the image region specifying unit 313 may display an image on the image display unit 33 and specify the image region SR of the machined surface based on an input operation conducted by the operator via the input device (not shown) of the tool state learning device 30.

The machine learning for constructing the trained model 250 to be provided in the tool state estimation device 20 has been described in the foregoing.

Next, the tool state estimation device 20 in the operation phase will be described.
<Tool State Estimation Device 20 in Operation Phase>

As illustrated in FIG. 1, the tool state estimation device 20 in the operation phase includes an input unit 201, a tool state estimation unit 202, a determination unit 203, a notification unit 204, and a storage unit 205.

Note that the tool state estimation device 20 further includes an arithmetic processor (not shown) such as a CPU in order to implement the operations of the functional blocks illustrated in FIG. 1. The tool state estimation device 20 is further provided with an auxiliary storage device (not shown) such as a read only memory (ROM) and a HDD that store various control programs, and a main storage device (not shown) such as a RAM that temporarily stores data required for the arithmetic processor to execute the programs.

In the tool state estimation device 20, the arithmetic processor reads the OS and application software from the auxiliary storage device, and performs arithmetic processing based on the OS and application software while developing the read OS and application software in the main storage device. The tool state estimation device 20 controls each piece of hardware based on results of the arithmetic processing. In this way, the functional blocks illustrated in FIG. 1 perform the respective processing. In other words, the tool state estimation device 20 can be implemented by hardware and software cooperating with each other.

The input unit 201 inputs, from the imaging device 10, an image of a machined surface of a workpiece W captured by the imaging device 10. The input unit 201 outputs the received image to the tool state estimation unit 202. In a case where the trained model 250 has been generated using an image of a machined surface in which the background image region BR and the image region AR other than the image region SR are masked as illustrated in FIG. 3, it is desirable that the input unit 201 performs masking processing on the received image in the same manner as of the image region specifying unit 313, when outputting the image to the tool state estimation unit 202.

The tool state estimation unit 202 inputs the image, which has been outputted by the input unit 201, to the trained model 250. In response to the input of the image, the trained model 250 provides an output, from which the tool state estimation unit 202 can estimate a "degree of tool wear" of the tool with which the machined surface shown in the inputted image has been cut, as a state of the tool.

The tool state estimation device 20 may output, for example, the degree of tool wear estimated by the tool state estimation unit 202 to a machine tool (not shown) or a control device (not shown), and update a pre-machining tool state contained in a tool management table (not shown) stored in a storage unit of the machine tool (not shown) or the control device (not shown).

The determination unit 203 determines whether or not to replace the tool, based on the degree of tool wear estimated by the tool state estimation unit 202.

More specifically, the determination unit 203 determines an optimal timing for tool replacement, based on a comparison between the estimated value of the degree of tool wear and a preset threshold value.

Figure 4:
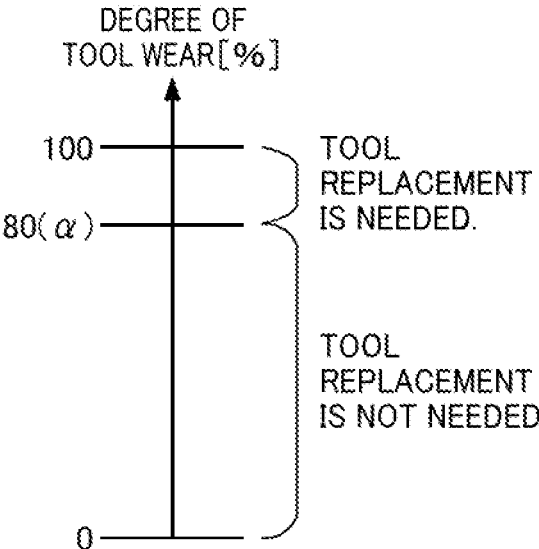
FIG. 4 is a diagram illustrating degrees of tool wear, as an example.

FIG. 4 is a diagram illustrating degrees of tool wear as an example. As described with reference to FIG. 2, since a cutting edge of a tool wears out as the number of times of cutting (i.e., the tool usage accumulation time) increases, the degree of tool wear increases accordingly. For example, when the degree of tool wear is "80%" or lower, the tool can cut a workpiece with appropriate machining accuracy. On the other hand, when the degree of tool wear is higher than "80%", the tool is on the verge of the time for replacement, and the operator will need to replace the tool.

In the following description, a degree of tool wear of "80%" is defined as a threshold value $\alpha$. The threshold value $\alpha$ may be set as appropriate according to, for example, the material of the workpiece W to be machined and the environment in which the machine tool (not shown) is installed.

The determination unit 203 determines whether or not a degree of tool wear estimated by the tool state estimation unit 202 is equal to or lower than the threshold value $\alpha$. When the estimated degree of tool wear is equal to or lower than the threshold value $\alpha$, the determination unit 203 determines that the tool is not to be replaced.

Contrary to this, when the estimated degree of tool wear is higher than the threshold value $\alpha$, the determination unit 203 determines that the time for tool replacement has been reached.

Although the determination unit 203 compares the estimated degree of tool wear with one threshold value $\alpha$ in the foregoing description, the determination unit 203 may compare the estimated degree of tool wear with two or more preset threshold values.

Specifically, for example, the determination unit 203 may compare the estimated degree of tool wear with a threshold value $\alpha_1$ and a threshold value $\alpha_2$ that are set to, for example, "80%" and "90%", respectively. In this case, the determination unit 203 may determine that the tool needs to be replaced when the estimated degree of tool wear is equal to or lower than the threshold value $\alpha_1$. When the estimated degree of tool wear is higher than the threshold value $\alpha_1$ and is equal to or lower than the threshold value $\alpha_2$, the determination unit 203 may determine to output an alarm indicating that the tool is on the verge of the time for replacement, and the tool needs to be replaced not immediately, but in the near future. When the estimated degree of tool wear is higher than the threshold value $\alpha_2$, the determination unit 203 may determine to output an alarm that prompts the operator to replace the tool immediately.

In this way, among the alarms indicating different messages, one alarm can be opportunely given according to a degree of tool wear estimated by means of the trained model 250.

Upon receiving from the determination unit 203 a determination that the tool is to be replaced, the notification unit 204 may output a tool replacement instruction to, for example, an output device (not shown) such as a liquid crystal display included in the machine tool (not shown) and/or the control device (not shown). The machine tool (not shown) may automatically replace the tool for which the tool replacement instruction has been outputted, by means of an automatic tool replacement device (not shown) included in the machine tool, on the basis of a tool management table (not shown) stored in the storage unit of the machine tool (not shown) or the control device (not shown).

The notification unit 204 may provide a notification by emitting sound via a speaker (not shown), or by lighting a rotary lamp, a signal lamp, or the like (not shown).

The storage unit 205 includes a ROM, a HDD, and the like, and may store the trained model 250 together with various control programs.

<Estimation Processing Performed by Tool State Estimation Device 20 in Operation Phase>

Next, the estimation processing performed by the tool state estimation device 20 according to the present embodiment will be described.

FIG. 5 is a flowchart illustrating the estimating processing performed by the tool state estimation device 20 in the operation phase. The illustrated flow may be executed every time an image of a machined surface of one workpiece W is inputted, or may be executed every time images of machined surfaces of 10 or 100 workpieces W are inputted at certain intervals.

In Step S11, the input unit 201 inputs, from the imaging device 10, an image of a machined surface of a workpiece W captured by the imaging device 10.

In Step S12, the tool state estimation unit 202 inputs the image received in Step S11 to the trained model 250, thereby estimating a degree of tool wear.

In Step S13, the determination unit 203 determines whether or not the degree of tool wear estimated in Step S12 is equal to or lower than the threshold value $\alpha$. When the degree of tool wear is equal to or lower than the threshold value $\alpha$, the determination unit 203 determines that the tool does not need to be replaced and the tool replacement is not to be performed. Subsequently, the process ends. On the other hand, when the degree of tool wear is higher than the threshold value $\alpha$, the determination unit 203 determines that the tool needs to be replaced and the tool replacement is to be performed. The process then proceeds to Step S14.

In Step S14, the notification unit 204 outputs a tool replacement instruction to the output device (not shown) of the machine tool (not shown) and/or the control device (not shown), based on the determination that the tool is to be replaced, received from the determination unit 203.

As described above, the tool state estimation device 20 according to the embodiment estimates a degree of tool wear as a state of a tool by inputting, to the trained model 250, an image captured by the imaging device 10 and showing a machined surface of a workpiece W.

Thus, the tool state estimation device 20 facilitates estimation of a state of a tool (i.e., a degree of tool wear) from the image of the machined surface, and makes it possible to appropriately determine a time for tool replacement, without resorting to the experience of an operator.

While one embodiment has been described in the foregoing, the tool state estimation device 20 and the tool state learning device 30 are not limited to the above-described embodiment, but encompass modifications, improvements, and the like within a range in which the object of the present invention can be achieved.

<Modification 1>

In the above-described embodiment, the tool state learning device 30 is exemplified as a device separate from the tool state estimation device 20, the machine tool (not shown), and the control device (not shown). However, some or all of the functions of the tool state learning device 30 may be included in the tool state estimation device 20, the machine tool (not shown), or the control device (not shown).

<Modification 2>

In the above-described embodiment, the tool state estimation device 20 is exemplified as a device separate from the machine tool (not shown) and the control device (not shown). However, some or all of the functions of the tool state estimation device 20 may be included in the machine tool (not shown) or the control device (not shown).

Alternatively, some or all of the input unit 201, the tool state estimation unit 202, the determination unit 203, the notification unit 204, and the storage unit 205 of the tool state estimation device 20 may be included in, for example, a server. Alternatively, the functions of the tool state estimation device 20 may be implemented by means of a virtual server function or the like on the cloud.

Furthermore, the tool state estimation device 20 may be configured as a distributed processing system in which the functions of the tool state estimation device 20 are appropriately distributed to a plurality of servers.

<Modification 3>

Figure 6:
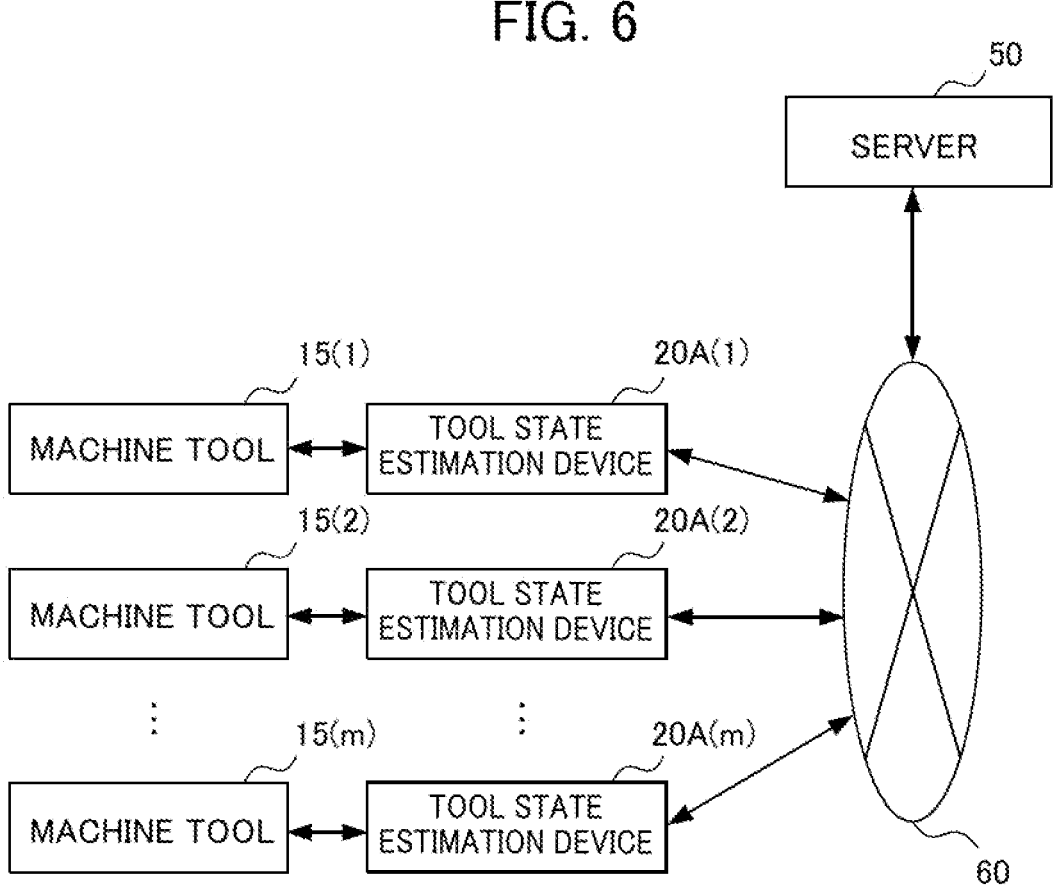
FIG. 6 is a diagram illustrating an example of a configuration of a tool state estimation system.

In the above-described embodiment, the tool state estimation device 20 estimates a degree of tool wear as a state of a tool, by using the trained model 250 provided from the tool state learning device 30, from an image of a machined surface captured by the imaging device 10. However, this is a non-limiting example. For example, as illustrated in FIG. 6, a server 50 may store the trained model 250 generated by the tool state learning device 30, and the trained model 250 may be downloaded from the server 50 to the m tool state estimation devices 20A(1) to 20A(m) (m is an integer equal to or greater than 2) that are connected to a network 60. This configuration makes it possible to apply the trained model 250 even in a case where a new machine tool and a new tool state estimation device are installed.

Each of the tool state estimation devices 20A(1) to 20A(m) is connected to an associated one of machine tools 15(1) to **15(*m*)**.

Each of the machine tools 15(1) to **15(*m*) includes an imaging device similar to the imaging device 10 illustrated in FIG. 1 and a control device (not shown). Each of the tool state estimation devices 20A(1) to 20A(m) corresponds to the tool state estimation device 20 illustrated in FIG. 1**.

Figure 7:
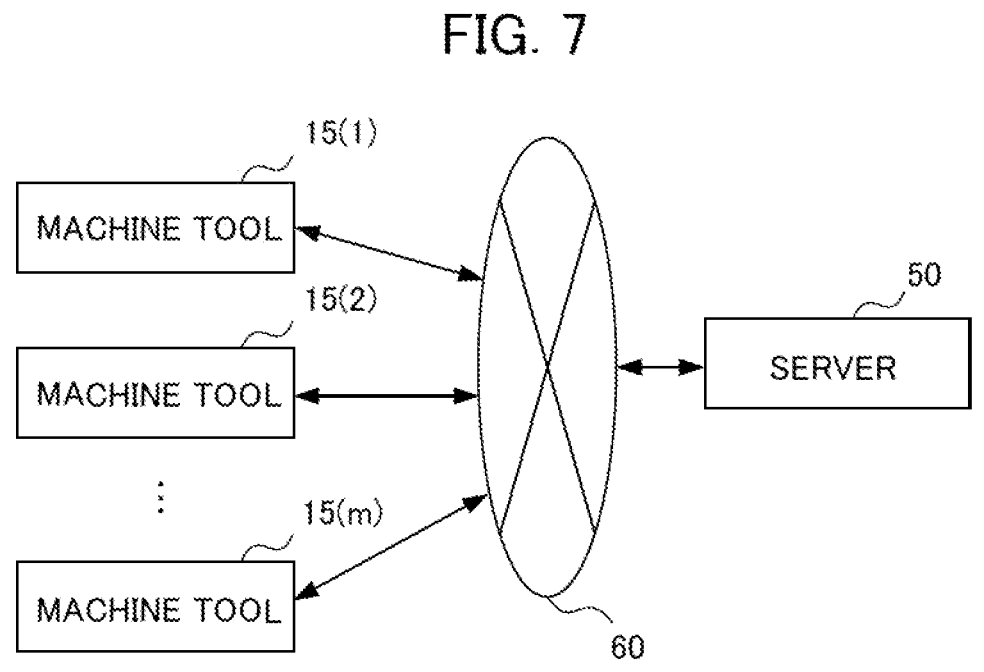

Alternatively, as illustrated in FIG. 7, a server 50 may operate as, for example, the tool state estimation device 20 and may estimate a tool state for each of the machine tools 15(1) to **15(*m*) connected to a network 60, from an image of a machined surface captured by the imaging device of each machine tool 15(*i*). Note that i is an integer from 1 to m. This configuration makes it possible to apply the trained model 250** even in a case where a new machine tool is installed.

The functions of the tool state estimation device 20 and the tool state learning device 30 according to one embodiment can be implemented by hardware, software, or a combination thereof. Here, the implementation by software means that a computer reads and executes a program for the implementation.

The components included in the tool state estimation device 20 and the tool state learning device 30 can be implemented by hardware including an electronic circuit or the like, software, or a combination thereof. When the functions are implemented by software, programs constituting the software are installed in a computer. Further, these programs may be recorded on a removable medium and distributed to users, or may be downloaded and distributed to users' computers via a network. In the case where the components are constituted by hardware, a part or all of the functions of the components included in the above-described devices can be implemented by an integrated circuit (IC), such as an application specific integrated circuit (ASIC), a gate array, a field programmable gate array (FPGA), and a complex programmable logic device (CPLD).

The programs may be stored and provided to a computer using various types of non-transitory computer readable media. The non-transitory computer readable media include various types of tangible storage media. Examples of the non-transitory computer readable media include a magnetic recording medium (e.g., a flexible disk, a magnetic tape, a hard disk drive), a magnetic-optical recording medium (e.g., a magnetic optical disk), a read only memory (CD-ROM), a CD-R, a CD-R/W, and a semiconductor memory (e.g., a mask ROM, a programmable ROM (PROM), an erasable PROM (EPROM), a flash ROM, and a RAM). The program may be provided to a computer by way of various types of transitory computer readable media. Examples of the transitory computer readable media include an electrical signal, an optical signal, and an electromagnetic wave. The transitory computer readable medium can provide a program to the computer through a wired communication line, such as a wire and an optical fiber, or through a wireless communication.

Steps of describing the program to be recorded on a recording medium include not only processes that are executed in time sequence according to the respective order, but also processes that are executed in parallel or individually and not necessarily in time sequence.

In other words, the tool state learning device, the tool state estimation device, the control device, the tool state learning method, and the tool state estimation method of the present disclosure can be implemented in various embodiments having the features described below.

(1) The tool state learning device 30 according to the present disclosure includes: a storage unit 32 configured to store an arbitrary image of a machined surface of an arbitrary workpiece captured by the imaging device 10 and, the machined surface having been cut with an arbitrary tool; a teacher data acquisition unit 311 configured to acquire, as input data, the arbitrary image stored in the storage unit 32 and acquires, as a label, a state of the tool, the state being annotated in accordance with predetermined grades each indicating a degree of tool wear based on the arbitrary image; and the tool state learning unit 312 configured to perform supervised learning using the input data and the label that have been acquired by the teacher data acquisition unit 311, and generates the trained model 250 configured to input a machined surface image of a machined surface of a workpiece W captured by the imaging device 10, and to output a state of a tool with which the machined surface of the workpiece W has been cut.

The tool state learning device 30 having this configuration makes it possible to generate the trained model 250 that outputs a state of a tool with accuracy, from an image of a machined surface.

(2) The tool state learning device 30 according to (1) may further include the image display unit 33 configured to display the arbitrary image to allow a state of the tool to be annotated in accordance with the predetermined grades.

Due to this feature, the tool state learning device 30 can acquire, as a label, the state of the tool that has been annotated in accordance with the predetermined grades each indicating a degree of tool wear.

(3) The tool state learning device 30 according to (1) or (2) may further include the image region specifying unit 313 configured to mask, in the arbitrary image, the image regions AR and BR other than the image region SR corresponding to the machined surface, and the teacher data acquisition unit 311 may acquire the arbitrary image having the image regions masked, as input data.

With this feature, the tool state learning device 30 can improve the estimation accuracy of the trained model 250 by performing supervised learning using an image having a masked region.

(4) In the tool state learning device 30 according to any one of (1) to (3), the tool state learning unit 312 may update the trained model 250 by performing the supervised learning using, as input data, a machined surface image newly capture by the imaging device 10 and using, as a label, a state of the tool outputted from the trained model 250 with respect to the inputted machined surface image.

With this feature, the tool state learning device 30 can improve the estimation accuracy of the trained model 250.

(5) In the tool state learning device 30 according to any one of (1) to (3), the teacher data acquisition unit 311 may acquire, as input data, tool information including at least one of a material, a shape, or a pre-machining state of the tool, together with the arbitrary image, and the tool state learning unit 312 may generate a trained model configured to input the machined surface image captured by the imaging device 10 and tool information regarding the tool with which machined surface shown in the machined surface image has been cut, and to output a state of the tool.

With this feature, the tool state learning device 30 can improve the estimation accuracy of the trained model 250.

(6) The tool state estimation device 20 according to the present disclosure includes: a trained model 250 generated by the tool state learning device 30 according to any one of (1) to (5), the trained model 250 being configured to input a machined surface image of a machined surface of a workpiece W captured by the imaging device 10 and to output a state of a tool with which the machined surface of the workpiece W has been cut; the input unit 201 configured to input a machined surface image of a machined surface captured by the imaging device 10; and the tool state estimation unit 202 configured to input the machined surface image inputted by the input unit 201 to the trained model 250 and thereby estimate a state of a tool with which the machined surface shown in the image has been cut.

The tool state estimation device 20 having this configuration makes it easy to estimate a state of a tool from an image of a machined surface.

(7) The tool state estimation device 20 according to (6) may further include the determination unit 203 configured to determine whether or not the time for replacement of the tool has been reached, based on the state of the tool estimated by the tool state estimation unit 202.

Due to this feature, the tool state estimation device 20 can notify the tool replacement time to the operator, with accuracy.

(8) The trained model 250 of the tool state estimation device 20 according to (6) or (7) may be provided in the server 50 that is accessible from the tool state estimation device 20 via the network 60.

Due to this feature, the tool state estimation device 20 can apply the trained model 250 even in a case where a new imaging device 10 and a new tool state estimation device 20 are installed.

(9) The tool state estimation device 20 according to any one of (6) to (8) may further include the tool state learning device 30 according to any one of (1) to (5).

Due to this feature, the tool state estimation device 20 can achieve the same effects as those of any one of (1) to (8) described above.

(10) The control device of the present disclosure may include the tool state estimation device 20 according to any one of (6) to (9).

The control device having this configuration can achieve the same effects as those of any one of (1) to (9) described above.

(11) The tool state learning method of the present disclosure includes: a teacher data acquisition step including acquiring, as input data, an arbitrary image of a machined surface of an arbitrary workpiece captured by the imaging device 10, the machined surface having been cut with an arbitrary tool, and acquiring, as a label, a state of the tool, the state being annotated in accordance with predetermined grades each indicating a degree of tool wear based on the arbitrary image; and a tool state learning step including performing supervised learning using the input data and the label that have been acquired, and generating a trained model configured to input a machined surface image of a machined surface of a workpiece captured by the imaging device 10, and to output a state of a tool with which the machined surface of the workpiece has been cut.

The tool state learning method can achieve the same effects as those of (1) described above.

(12) The tool state estimation method of the present disclosure includes: an input step including inputting a machined surface image of a machined surface captured by the imaging device 10; and an estimation step including inputting the machined surface image that has been inputted in the input step to a trained model 250 generated by the tool state learning device 30 according to any one of (1) to (4), the trained model 250 being configured to input a machined surface image of a machined surface of a workpiece W captured by the imaging device 10 and to output a state of a tool with which the machined surface of the workpiece W has been cut, and thereby estimating a state of the tool with which the machined surface shown in the machined surface image has been cut.

The tool state estimation method can achieve the same effects as those of (6) described above.

EXPLANATION OF REFERENCE NUMERALS

1: Tool State Estimation System
10: Imaging Device
20: Tool State Estimation Device
201: Input Unit
202: Tool State Estimation Unit
203 Determining Unit
204: Notification Unit
205: Storage Unit
250: Trained Model
30: Tool State Learning Device
311: Teacher Data Acquisition Unit
312: Tool State Learning Unit
313: Image Region Specifying Unit
32: Storage Unit
321: Teacher Data
33: Image Display Unit

The invention claimed is:

1. A tool state learning device comprising:

a memory configured to store a program and an arbitrary image of a machined surface of an arbitrary workpiece captured by an imaging device, the machined surface having been cut with an arbitrary tool; and a processor configured to execute the program stored on the memory to cause the tool state learning device to:

acquire, as input data, the arbitrary image stored in the memory and acquire, as a label, a state of the tool, the state being annotated in accordance with predetermined grades each indicating a degree of tool wear based on the arbitrary image;

perform matching processing by using at least CAD data and the arbitrary image, specify the image region of the machined surface, mask, in the arbitrary image, an image region other than the specified image region of the machined surface, and eliminate the effect of the reflection from the image region other than the specified image region of the machined surface;

acquire the arbitrary image having the image region masked, as input data; and perform supervised learning using the input data and the label that have been acquired, and generate a trained model configured to input a machined surface image of a machined surface of a workpiece captured by the imaging device, and to output a state of a tool with which the machined surface of the workpiece has been cut.

2. The tool state learning device according to claim 1, wherein the processor displays the arbitrary image to allow a state of the tool to be annotated in accordance with the predetermined grades on a display.

3. The tool state learning device according to claim 1, wherein the processor updates the trained model by performing the supervised learning using, as input data, a machined surface image newly captured by the imaging device and using, as a label, a state of the tool outputted from the trained model with respect to the newly captured machined surface image.

4. The tool state learning device according to claim 1, wherein the processor acquires, as input data, tool information including at least one of a material, a shape, or a pre-machining state of the tool, together with the arbitrary image, and wherein the processor generates a trained model configured to input the machined surface image captured by the imaging device and tool information regarding the tool with which the machined surface shown in the machined surface image has been cut, and to output a state of the tool.

5. A tool state estimation device comprising:

a memory configured to store a program and a trained model generated by the tool state learning device according to claim 1, the trained model being configured to input a machined surface image of a machined surface of a workpiece captured by an imaging device and to output a state of a tool with which the machined surface of the workpiece has been cut; and a processor configured to execute the program stored on the memory to cause the tool state estimation device to:

input a machined surface image of a machined surface captured by the imaging device;

input the inputted machined surface image to the trained model and thereby estimate degree of tool wear as a state of a tool with which the machined surface shown in the image has been cut; and determine whether or not time for replacement of the tool has been reached, based on the estimated degree of the tool wear, wherein the processor determines that the time for replacement of the tool has been reached, when the estimated degree of tool wear is higher than a predetermined threshold value.

6. The tool state estimation device according to claim 5, wherein the trained model is provided in a server that is accessible from the tool state estimation device via a network.

7. The tool state estimation device according to claim 5, further comprising:

a tool state learning device comprising:

a memory configured to store a program and an arbitrary image of a machined surface of an arbitrary workpiece captured by an imaging device, the machined surface having been cut with an arbitrary tool; and a processor configured to execute the program stored on the memory to cause the tool state learning device to:

acquire, as input data, the arbitrary image stored in the memory and acquire, as a label, a state of the tool, the state being annotated in accordance with predetermined grades each indicating a degree of tool wear based on the arbitrary image;

perform matching processing by using at least CAD data and the arbitrary image, specify the image region of the machined surface, mask, in the arbitrary image, an image region other than the specified image region of the machined surface, and eliminate the effect of the reflection from the image region other than the specified image region of the machined surface;

acquire the arbitrary image having the image region masked, as input data; and perform supervised learning using the input data and the label that have been acquired, and generate a trained model configured to input a machined surface image of a machined surface of a workpiece captured by the imaging device, and to output a state of a tool with which the machined surface of the workpiece has been cut.

8. A control device comprising:

the tool state estimation device according to claim 5.

9. A tool state estimation method comprising:

an input step including inputting a machined surface image of a machined surface captured by an imaging device;

an estimation step including inputting the machined surface image that has been inputted in the input step to a trained model generated by the tool state learning device according to claim 1, the trained model being configured to input a machined surface image of a machined surface of a workpiece captured by the imaging device and to output a state of a tool with which the machined surface of the workpiece has been cut, and estimating degree of tool wear as a state of the tool with which the machined surface shown in the machine surface image has been cut; and a determination step including determining whether or not time for replacement of the tool has been reached, based on the estimated degree of the tool wear, wherein the determination step determines that the time for replacement of the tool has been reached, when the estimated degree of tool wear is higher than a predetermined threshold value.

10. A non-transitory computer readable medium configured to store a program for causing a processor to control a tool state learning device to execute a tool state learning method, the tool state learning method comprising:

acquiring, as input data, an arbitrary image of a machined surface of an arbitrary workpiece captured by an imaging device, the machined surface having been cut with an arbitrary tool, and acquiring, as a label, a state of the tool, the state being annotated in accordance with predetermined grades each indicating a degree of tool wear based on the arbitrary image;

performing matching processing by using at least CAD data and the arbitrary image, specifying the image region of the machined surface, masking, in the arbitrary image, an image region other than the specified image region of the machined surface, and eliminating the effect of the reflection from the image region other than the specified image region of the machined surface;

acquiring the arbitrary image having the image region masked, as input data; and performing supervised learning using the input data and the label that have been acquired, and generating a trained model configured to input a machined surface image of a machined surface of a workpiece captured by the imaging device, and to output a state of a tool with which the machined surface of the workpiece has been cut.

\* \* \* \* \*